(12) United States Patent
Liu (10) Patent No.: US 8,811,004 B2
(45) Date of Patent: Aug. 19, 2014

(54) DISPLAY DEVICE FOR NOTEBOOK COMPUTER

(71) Applicant: Wistron Corporation, New Taipei (TW)

(72) Inventor: Li-Wei Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 106 days.

(21) Appl. No.: 13/653,668

(22) Filed: Oct. 17, 2012

(65) Prior Publication Data

US 2013/0314867 A1 Nov. 28, 2013

(30) Foreign Application Priority Data

May 25, 2012 (TW) .............................. 101118765 A (51) Int. Cl.
*G06F 1/16* (2006.01)
*G02F 1/1333* (2006.01)

(52) U.S. Cl.
USPC ............ 361/679.26; 361/679.24; 361/679.55; 349/58; 349/60

(58) Field of Classification Search
USPC ............ 361/679.01–679.45, 679.55–679.59; 349/58–60; 312/223.1, 223.2; 345/156, 345/157, 168, 169, 905; 313/582
See application file for complete search history.

(56) References Cited

U.S. PATENT DOCUMENTS

| | | | |
|---|---|---|---|
| 6,151,207 A * | 11/2000 | Kim ......................... | 361/679.26 |
| 6,172,869 B1 | 1/2001 | Hood, III et al. | |
| 6,636,282 B2 * | 10/2003 | Ogawa et al. ................... | 349/58 |
| 6,828,721 B2 * | 12/2004 | Wakita ........................... | 313/491 |
| 7,267,313 B2 * | 9/2007 | Krzoska et al. ............ | 248/316.8 |
| 7,304,837 B2 * | 12/2007 | Lo et al. .................... | 361/679.27 |
| 7,609,529 B2 * | 10/2009 | Chiang et al. ................ | 361/810 |
| 7,936,413 B2 * | 5/2011 | Jeong et al. ..................... | 349/58 |
| 8,434,251 B2 * | 5/2013 | Lee et al. ........................ | 40/780 |
| 8,493,722 B2 | 7/2013 | Chien et al. | |
| 8,599,331 B2 * | 12/2013 | Zhao .............................. | 349/58 |
| 2004/0141102 A1 * | 7/2004 | Lin ................................. | 349/58 |
| 2005/0195560 A1 * | 9/2005 | Kim et al. ..................... | 361/681 |
| 2008/0019084 A1 * | 1/2008 | Lee et al. ...................... | 361/679 |

FOREIGN PATENT DOCUMENTS

| | | |
|---|---|---|
| TW | M295413 U | 8/2006 |
| TW | 201211960 A | 3/2012 |
| TW | M428371 U | 5/2012 |

OTHER PUBLICATIONS

Office Action dated Jun. 23, 2014 to Taiwanese Patent Application No. 101118765.

* cited by examiner

*Primary Examiner* — Nidhi Desai
(74) *Attorney, Agent, or Firm* — The Mueller Law Office, P.C.

(57) ABSTRACT

A display device includes a cover having an inner surface, and a resilient piece having a first through hole formed in a main plate thereof and two arm units respectively extending from two opposite lateral ends of the main plate and fixed to the inner surface. A display panel includes a protruding portion corresponding in position to the resilient piece, and a second through hole registered with the first through hole. A bezel includes a third through hole registered with the second through hole. The shock absorbing positioner includes a positioning post inserted consecutively and frictionally through the third, second and first through holes to fix together the bezel, the display panel and the resilient piece.

17 Claims, 8 Drawing Sheets

DISPLAY DEVICE FOR NOTEBOOK COMPUTER

CROSS REFERENCE TO RELATED APPLICATION

This application claims priority of Taiwanese Patent Application No. 101118765, filed on May 25, 2012, the disclosure of which is incorporated herein by reference.

1. FIELD OF THE INVENTION

The invention relates to a display device, more particularly to a display device for a notebook computer.

2. DESCRIPTION OF THE RELATED ART

Figure 1:
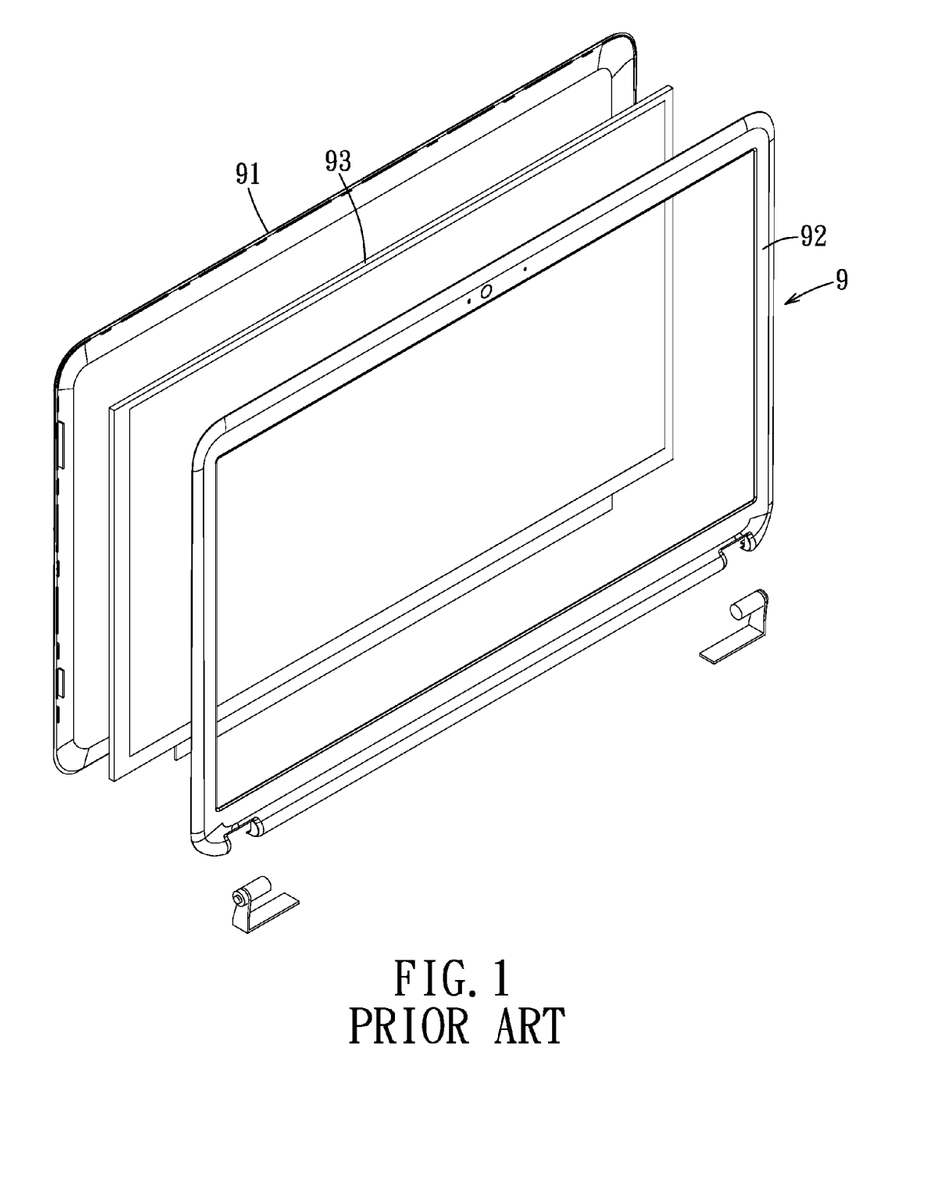
FIG. 1 is an exploded perspective view of a conventional display device for a notebook computer.

Referring to FIG. 1, a conventional display device 9 for a notebook computer is shown to include a cover 91, a bezel 92 connected to the cover 91, and a display panel 93 embedded within the bezel 92.

Generally, the cover 91 and the bezel 92 are assembled to each other by using a plurality of screws (not shown). To achieve light and thin display device 9, thin screws must be used and the number of the screws must be reduced. However, this results in a poor fixation effect. On the other hand, some manufacturers assemble the cover 91 and the bezel 92 using an adhesive. However, it is difficult to rework or repair the display device 9 using such method.

SUMMARY OF THE INVENTION

Therefore, an object of the present invention is to provide a display device for a notebook computer that dispenses with the use of screws.

According to the present invention, a display device for a notebook computer comprises a cover having an inner surface, a resilient piece, a display panel, a bezel and a shock absorbing positioner. The resilient piece includes a main plate spaced apart from and parallel to the inner surface of the cover, a first through hole formed in the main plate, and two arm units respectively extending from two opposite lateral ends of the main plate and fixed to the inner surface of the cover. The display panel includes a panel module disposed on the inner surface of the cover, a frame surrounding fixedly a periphery of the panel module, a protruding portion protruding from the frame in a direction parallel to the inner surface of the cover and corresponding in position to the resilient piece, and a second through hole formed in the protruding portion and registered with the first through hole. The bezel includes a bezel body covering the display panel at a side that is distal from the cover, and a third through hole formed in the bezel body and registered with the second through hole. The shock absorbing positioner includes a pad body abutting against a surface of the bezel body that is distal from the display panel, and a positioning post protruding from one side of the pad body that is proximate to the bezel body. The positioning post is inserted consecutively and frictionally through the third through hole, the second through hole and the first through hole to fix together the bezel, the display panel and the resilient piece.

Preferably, the resilient piece further includes a first positioning hole formed in the main plate and spaced apart from the first through hole. The protruding portion of the display panel is formed with a second positioning hole that is registered with the first positioning hole. The bezel further includes a third positioning hole formed in the bezel body and registered with the second positioning hole. The display panel further includes an auxiliary positioning element. The auxiliary positioning element includes a base portion having an outer diameter matching a hole diameter of the first positioning hole so as to be frictionally positioned therein, a spacer portion connected to the base portion and having an outer diameter larger than that of the base portion, and an extension portion extending from the spacer portion into the second and third positioning holes.

Preferably, the extension portion of the auxiliary positioning element has an outer diameter smaller than a hole diameter of the second and third positioning holes. The auxiliary positioning element further includes a positioning cap having an inner diameter matching that of the extension portion, and an outer diameter matching the hole diameter of the second and third positioning holes. The positioning cap is frictionally sleeved on the extension portion and being frictionally positioned in the second and third positioning holes. The extension portion of the auxiliary positioning element has an outer surface formed with a plurality of projections.

To fix the resilient piece to the cover, the below method can be implemented. The cover is provided with two spaced-apart limiting bodies corresponding in position to the resilient piece. Each of the limiting bodies includes a surrounding wall connected transversely to the inner surface of the cover, and a limiting wall connected to the surrounding wall and disposed oppositely of and parallel to the inner surface of the cover. The surrounding wall and the limiting wall of each of the limiting bodies cooperate with the inner surface of the cover to define a receiving space having an opening. The openings of the receiving spaces of the limiting bodies face each other. The arm units of the resilient piece are bent arcuately in opposite directions after respectively extending from the two opposite lateral ends of the main plate toward the casing and are inserted respectively into the receiving spaces via the openings. Further, each of the arm units is configured as a bent plate, and is formed with an elongated slot.

To achieve a better fixing effect, the resilient piece further includes a clamping portion configured to clamp the protruding portion of the display panel. The clamping portion has a connecting plate extending transversely from an outer end of the main plate that is between the two opposite lateral ends thereof in a direction away from the cover, and a clamping plate extending from an end of the connecting plate that is distal from the main plate toward an inner end of the main plate that is opposite to the outer end. The resilient piece and the frame and the protruding portion of the display panel are made of metal or are sputtered with metallic substances on surfaces thereof.

Another means of enhancing the fixing effect is that the cover further has a clamping portion formed on the inner surface thereof and disposed in a position corresponding to the resilient piece to clamp the protruding portion of the display panel. The clamping portion has a connecting plate extending from the inner surface of the cover and passing through an outer end of the main plate that is between the two opposite lateral ends thereof in a direction away from the cover, and a clamping plate extending from an end of the connecting plate that is distal from the main plate toward an inner end of the main plate that is opposite to the outer end. Preferably, the connecting plate has a wavy shape, and the wavy pattern of the connecting plate 231 is such that a line that is tangent to a crest point of each wave and a line that connects the crest point and an adjacent trough point form therebetween an included angle that is smaller than 45 degrees. Similarly, to assist grounding, the clamping portion and the frame and the protruding portion of the display panel are made of metal or are sputtered with metallic substances on surfaces thereof.

An alternative form of the resilient piece is that the resilient piece further includes a stud extending from a surface of the main plate that is distal from the cover. The stud is spaced apart from the first through hole. The protruding portion of the display panel is formed with a positioning hole to receive the stud. Further, each of the arm units of the resilient piece includes a pair of wavy arms connected between the main plate and the inner surface of the cover, and the wavy pattern of each of the wavy arms is such that a line that is tangent to a crest point of each wave and a line that connects the crest point and an adjacent trough point form therebetween an included angle that is smaller than 45 degrees. Moreover, the resilient piece further includes an auxiliary resilient member disposed between the first through hole and the stud. The auxiliary resilient member is formed on the main plate distal from the cover by stamping, and has a substantially L-shaped body configured to contact the protruding portion.

Below is a description of how the shock absorbing positioner fixes together the bezel, the display panel and the resilient piece. The positioning post of the shock absorbing positioner has a peripheral surface formed with a first annular groove that is distal from the pad body, and a second annular groove that is proximate to the pad body. The resilient piece is retained in the first annular groove and the bezel and the protruding portion of the display panel are retained in the second annular groove when the positioning post extends consecutively through the third through hole, the second through hole and the first through hole. Or, the first through hole has a hole diameter smaller than that of the second and third through holes. The positioning post has a peripheral surface formed with an annular groove. The resilient piece is retained in the annular groove and the protruding portion and the bezel are retained between the annular groove and the pad body when the positioning post extends consecutively through the third through hole, the second through hole and the first through hole.

The beneficial effect of this invention resides in that by using the coordination of the resilient piece and the shock absorbing positioner, a screwless and stable positioning effect can be achieved, and shock absorbing and grounding effects are incorporated as well.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

The above-mentioned and other technical contents, features, and effects of this invention will be clearly presented from the following detailed description of three embodiments in coordination with the reference drawings.

Before this invention is described in detail, it should be noted that, in the following description, similar elements are designated by the same reference numerals.

Figure 2:
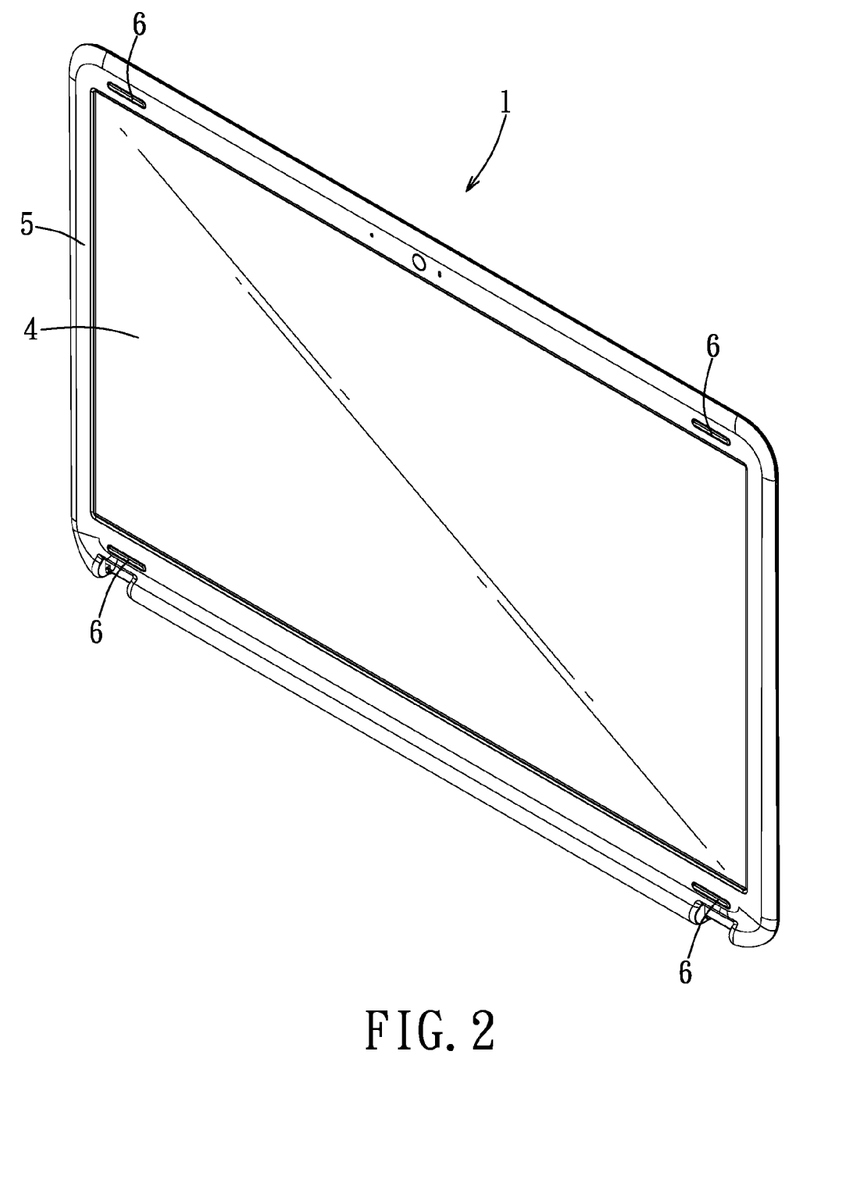
FIG. 2 is an assembled perspective view of a display device for a notebook computer according to the first embodiment of this invention.

Referring to FIG. 2, a display device 1 for a notebook computer according to this invention is adapted to be mounted pivotably to a host of a notebook computer (not shown) to cover or uncover the same.

Figure 3:
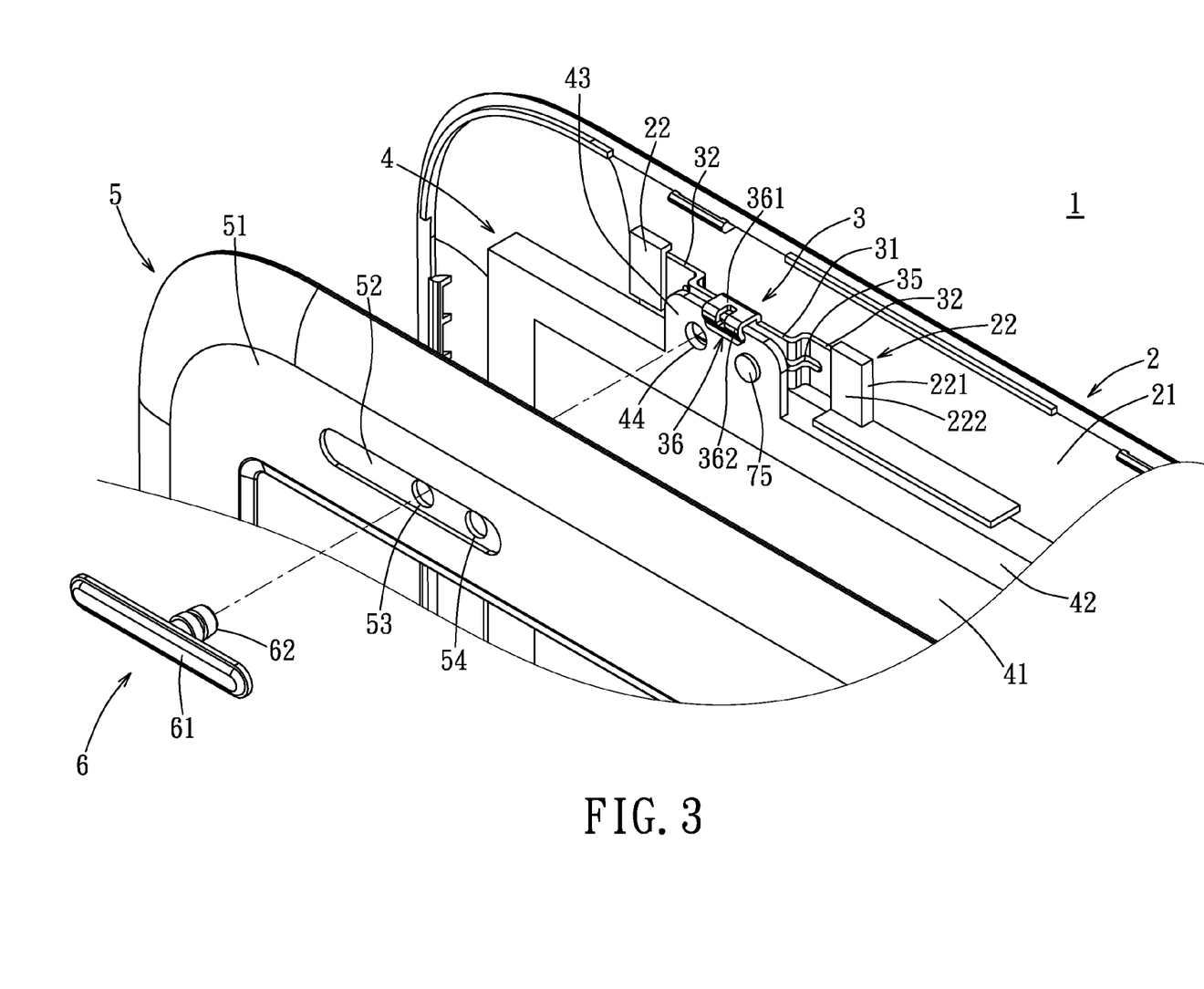
FIG. 3 is a fragmentary exploded perspective view of the first embodiment.
Figure 4:
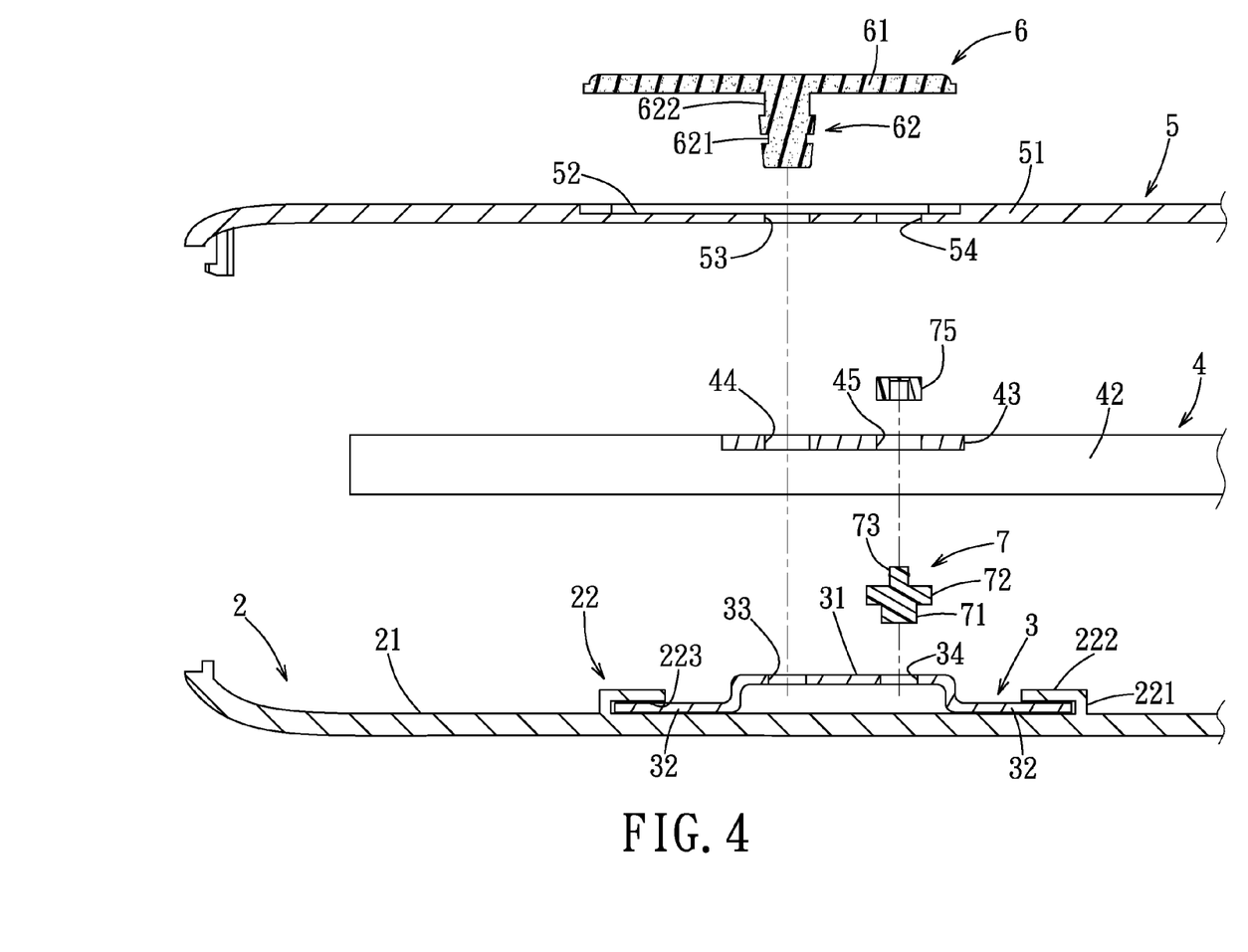
FIG. 4 is a fragmentary exploded sectional view of the first embodiment.
Figure 5:
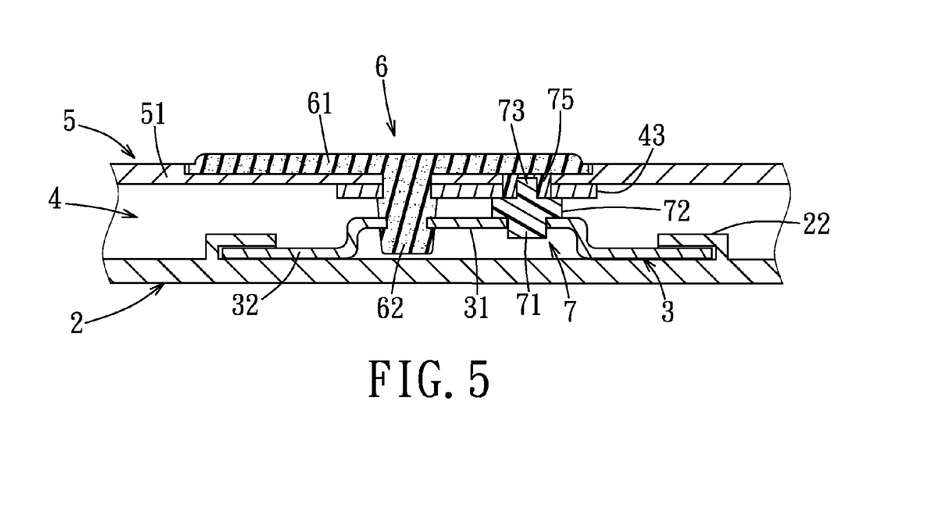
FIG. 5 is a fragmentary sectional view of the first embodiment in an assembled state.

Referring to FIGS. 3, 4 and 5, in combination with FIG. 2, the display device 1 comprises a cover 2, a resilient piece 3, a display panel 4, a bezel 5, a shock absorbing positioner 6 and an auxiliary positioning element 7. In this embodiment, each corner of the display device 1 employs the structural cooperation of the resilient piece 3, the shock absorbing positioner 6 and the auxiliary positioning element 7. The other corners of the display device 1 may employ the mechanisms disclosed in the second and third embodiments or other mechanisms to carry out the assembly and fixing effects of the display device 1. Since the structural cooperation of the resilient piece 3, the shock absorbing positioner 6 and the auxiliary positioning element 7 at each corner of the display device 1 is similar, only the structural cooperation of the resilient piece 3, the shock absorbing positioner 6 and the auxiliary positioning element 7 at one of the corners of the display device 1 will be described hereinafter.

The cover 2 has an inner surface 21, and two spaced-apart limiting bodies 22 formed on the inner surface 21. Each of the limiting bodies 22 includes a substantially U-shaped surrounding wall 221 connected transversely to the inner surface 21, and a limiting wall 222 connected to the surrounding wall 221 and disposed oppositely of and parallel to the inner surface 21. The inner surface 21, the surrounding wall 221 and the limiting wall 222 cooperatively define a receiving space 223 having an opening. The openings of the receiving spaces 223 of the limiting bodies 22 face each other.

In this embodiment, the resilient piece 3 is formed by punching a metal sheet into the required configuration, and provides shock absorbing and grounding effects. However, it is not limited as such. The resilient piece 3 may be made from a resilient non-metallic material. In this case, the resilient piece 3 is sputtered with metallic substances at least partially on a surface thereof to achieve a grounding effect. The resilient piece 3 includes a main plate 31 spaced apart from and parallel to the inner surface 21, a first through hole 33 and a first positioning hole 34 formed in the main plate 31 and spaced apart from each other in a left-right direction, two arm units 32 respectively extending from two opposite lateral ends of the main plate 31 toward the casing 2 and then bent arcuately in opposite directions, and a clamping portion 36. Each of the arm units 32 is configured as a bent plate, and is formed with an elongated slot 35. As such, the resilient piece 3 can have a better resiliency and can promote reduction of vibration. The arm units 32 are respectively inserted into the receiving spaces 223 via the openings thereof to fix the resilient piece 3 to the inner surface 21 of the cover 2. The clamping portion 36 has a connecting plate 361 extending transversely from an outer end of the main plate 31 that is between the two opposite lateral ends thereof away from the cover 2, and a clamping plate 362 extending from an end of the connecting plate 361 that is distal from the main plate 31 toward an inner end of the main plate 31 that is opposite to the outer end. The functions of the clamping portion 36, the first through hole 33 and the first positioning hole 34 will be described below in coordination with the other components.

Figure 6:
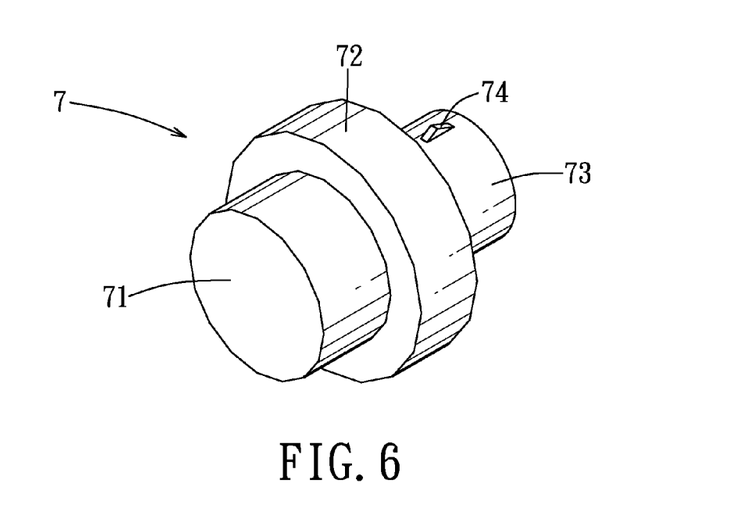
FIG. 6 is a perspective view of a auxiliary positioning element of the first embodiment.

Referring to FIG. 6, the auxiliary positioning element 7 includes a base portion 71 having an outer diameter matching a hole diameter of the first positioning hole 34, a spacer portion 72 connected to the base portion 71 and having an outer diameter larger than that of the base portion 71, an extension portion 73 connected to the spacer portion 72 and having an outer diameter smaller than that of the base portion 71, a plurality of spaced-apart projections 74 formed on an outer surface of the extension portion 73, and a positioning cap 75. The base portion 71 is frictionally pre-positioned in the first positioning hole 34 during assembly.

The display panel 4 includes a panel module 41 disposed on the inner surface 21 of the cover 2, a frame 42 made of metal and fixedly surrounding a periphery of the panel module 41, a protruding portion 43 protruding integrally from the frame 42 in a direction parallel to the inner surface 21 of the cover 2 and corresponding in position to the resilient piece 3, and a second through hole 44 and a second positioning hole 45 that are formed in the protruding portion 43 and that are respectively registered with the first through hole 33 and the first positioning hole 34. Alternatively, the frame 42 and the protruding portion 43 may be made of a non-metal material. In this case, the frame 42 and the protruding portion 43 may be sputtered with metallic substances on surfaces thereof, and then cooperate with the resilient piece 3 for achieving the grounding effect.

With reference to FIG. 5, during assembly of the display panel 4 and the cover 2, the protruding portion 43 is brought to abut against a surface of the spacer portion 72 that is proximate to the extension portion 73 so that the extension portion 73 can extend into the second positioning hole 45. At this time, the second through hole 44 is aligned with the first through hole 33, and the protruding portion 43 is clamped by the clamping portion 36 of the resilient piece 3. That is, a surface of the protruding portion 43 that is distal from the main plate 31 is pushed by the clamping plate 362 toward the main plate 31 so as to reduce rocking of the display panel 4 in a direction transverse to the cover 2. Next, the positioning cap 75 is inserted into the second positioning hole 45 to engage with the extension portion 73. The positioning cap 75 in this embodiment has an inner diameter matching the outer diameter of the extension portion 73, and an outer diameter matching a hole diameter of the second positioning hole 45. Because of the presence of the projections 73 on the surface of the extension portion 73, friction between the extension portion 73 and the positioning cap 75 can be increased. Further, because the outer diameter of the positioning cap 75 matches the hole diameter of the second positioning hole 45, the positioning cap 75 can be frictionally positioned in the second positioning hole 45.

The bezel 5 includes a bezel body 51 covering the display panel 4 at a side that is distal from the cover 2, an elongated shallow groove 52 formed in a surface of the bezel body 51 that is distal from the display panel 4, and a third through hole 53 and a third positioning hole 54 formed in a groove wall that defines the shallow groove 52. The third through hole 53 is registered with the first and second through holes 33, 44, and the third positioning hole 54 is registered with the second positioning hole 45.

The shock absorbing positioner 6 is pre-assembled to the bezel 5, and is made of rubber. The shock absorbing positioner 6 includes an elongated pad body 61 abutting against a surface of the bezel body 51 that is distal from the display panel 4, and a positioning post 62 protruding from one side of the pad body 61 that is proximate to the bezel body 51. Concretely speaking, the pad body 61 has a contour conforming to that of the shallow groove 52 so as to be received therein. The pad body 61 protrudes partially out of the shallow groove 52, as best shown in FIG. 5. The positioning post 62 extends through the third through hole 53, and has a peripheral surface formed with a first annular groove 621 and a second annular groove 622 that are spaced apart from each other. The first annular groove 621 is distal from the pad body 61, while the second annular groove 622 is proximate to the pad body 61.

With reference to FIGS. 3 to 5, after the shock absorbing positioner 6 is pre-assembled to the bezel 5, the positioning post 62 is inserted consecutively and frictionally through the second through hole 44 and the first through hole 33. As such, the resilient piece 3 is retained in the first annular groove 621, and the protruding portion 43 of the display panel 4 and the bezel 5 are retained in the second annular groove 622. Through this, the bezel 5, the display panel 4 and the resilient piece 3 are fixed securely to each other.

Through the coordination of the resilient piece 3 and the shock absorbing positioner 6 and other coordinating structures, assembly of the display device 1 does not need the use of screws, and the display device 1 can achieve a stable positioning effect and a good shock absorbing effect.

Figure 7:
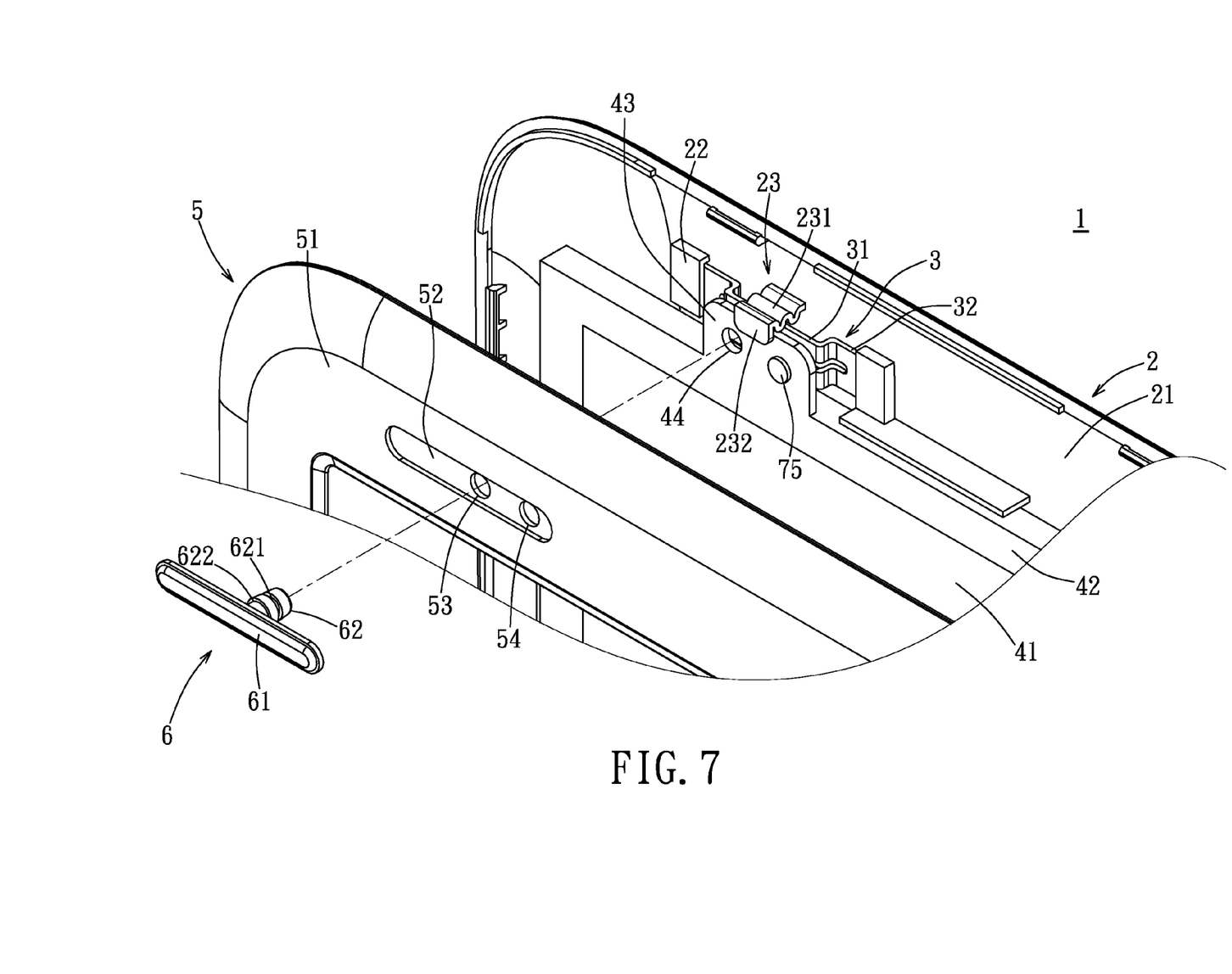
FIG. 7 is a fragmentary exploded perspective view of a display device for a notebook computer according to the second embodiment of this invention.

Referring to FIG. 7, the second embodiment of the display device 1 is shown to be similar to the first embodiment. However, in this embodiment, the resilient piece 3 does not have the clamping portion 36 (see FIG. 3). Instead, the cover 2 includes a clamping portion 23 that is formed on the inner surface 21 thereof, that is disposed in a position corresponding to the resilient piece 3, and that is configured to clamp the protruding portion 43 of the display panel 4. The clamping portion 23 can be made of a metal or non-metal material. If the clamping portion 23 is made of the non-metal material, a surface thereof may be sputtered with metallic substances. The clamping portion 23 includes a connecting plate 231 and a clamping plate 232. The connecting plate 231 extends from the inner surface 21 in a direction away from the cover 2 and passes through the outer end of the main plate 31 of the resilient piece 3. The clamping plate 232 extends from an end of the connecting plate 231 that is distal from the main plate toward the inner end of the main plate 31. The connecting plate 231 has a wavy shape. The wavy pattern of the connecting plate 231 is such that a line that is tangent to a crest point of each wave and a line that connects the crest point and an adjacent trough point form therebetween an included angle that is smaller than 45 degrees.

The clamping portion 23 of this embodiment is configured to have a wavy shape so as to provide a better resiliency and facilitate assembly and disassembly. In addition, it also reduces rocking of the display panel 4 in a direction transverse to the cover 2.

Figure 8:
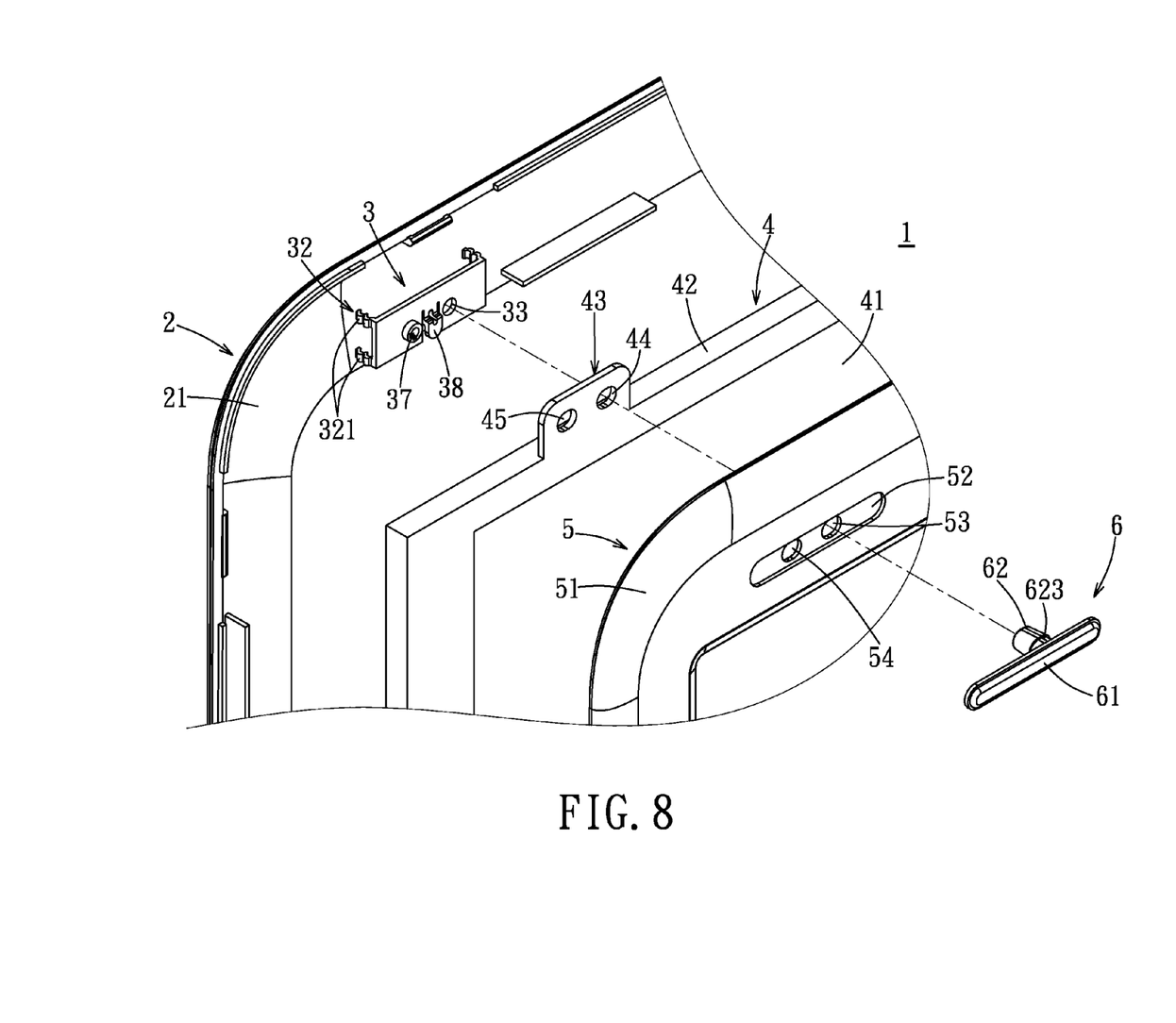
FIG. 8 is a fragmentary exploded perspective view of a display device for a notebook computer according to the third embodiment of this invention.
Figure 9:
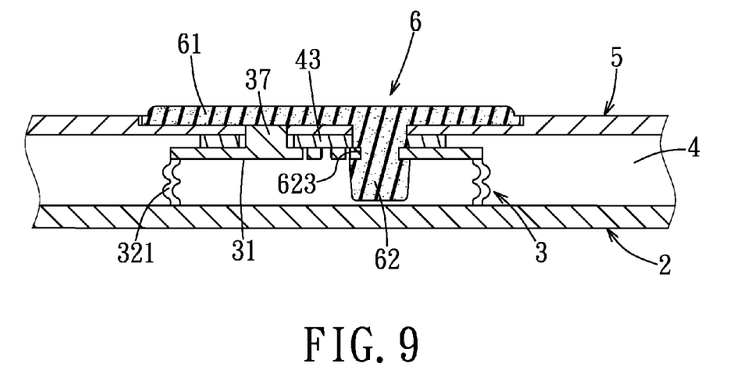
FIG. 9 is a sectional view of the third embodiment in an assembled state.

Referring to FIGS. 8 and 9, the third embodiment of the display device 1 is shown to be similar to the first embodiment. However, in this embodiment, the auxiliary positioning element 7 (see FIG. 4) is dispensed herewith, the structure of the resilient piece 3 is different, and the shape of the positioning post 62 of the shock absorbing positioner 6 is also slightly different.

In this embodiment, the resilient piece 3 and the cover 2 are formed integrally as one piece, so that the limiting bodies 22 (see FIG. 3) are dispensed herewith. Further, the first positioning hole 34 (see FIG. 4) is replaced by a stud 37 that protrudes from the surface of the main plate 31 that is distal from the cover 2. The resilient piece 3 further includes an auxiliary resilient member 38 disposed between the first through hole 33 and the stud 37. The second positioning hole 45 in the protruding portion 43 of the display panel 4 corresponds in position to the stud 37.

The auxiliary resilient member 38 is formed on the surface of the main plate 31 that is distal from the cover 2 by stamping. The auxiliary resilient member 38 has a substantially L-shaped body configured to contact the protruding portion 43. When the protruding portion 43 is stacked on the resilient piece 3, the auxiliary resilient member 38 resiliently deforms to ensure contact with the protruding portion 43. In addition, the configuration of the auxiliary resilient member 38 further enhances the shock absorbing effect of the resilient piece 3.

In this embodiment, the hole diameter of the first through hole 33 is smaller than that of the second through hole 44 in the display panel 4 and the third through hole 53 in the bezel 5. Further, the positioning post 62 of the shock absorbing positioner 6 has only one annular groove 623. After the shock absorbing positioner 6 is pre-assembled to the bezel 5, the positioning post 62 is inserted consecutively and frictionally through the second through hole 44 and the first through hole 33. As such, the resilient piece 3 is retained in the annular groove 623 of the positioning post 62, and the protruding portion 43 and the bezel 5 are retained between the annular groove 623 and the pad body 61. Through this, the bezel 5, the display panel 4 and the resilient piece 3 are fixed securely to each other.

Moreover, in this embodiment, each of the arm units 32 of the resilient piece 3 includes a pair of wavy arms 321 connected between the main plate 31 and the inner surface 21 of the cover 2. The wavy pattern of each wavy arm 321 is such that a line that is tangent to a crest point of each wave and a line that connects the crest point and an adjacent trough point form therebetween an included angle that is smaller than 45 degrees. Through this, the resilient piece 3 can provide a better resiliency and can reduce rocking of the display panel 4 in a direction transverse to the cover 2.

In sum, the display device 1 for a notebook computer according to this invention uses the coordination of the resilient piece 3 and the shock absorbing positioner 6 to achieve a screwless and stable positioning effect and to incorporate shock absorbing and grounding effects as well. Hence, the object of this invention is served.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display device for a notebook computer, comprising:
a cover having an inner surface;
a resilient piece including a main plate spaced apart from and parallel to said inner surface of said cover, a first through hole formed in said main plate, and two arm units respectively extending from two opposite lateral ends of said main plate and fixed to said inner surface of said cover;
a display panel including a panel module disposed on said inner surface of said cover, a frame surrounding fixedly a periphery of said panel module, a protruding portion protruding from said frame in a direction parallel to said inner surface of said cover and corresponding in position to said resilient piece, and a second through hole formed in said protruding portion and registered with said first through hole;
a bezel including a bezel body covering said display panel at a side that is distal from said cover, and a third through hole formed in said bezel body and registered with said second through hole; and
a shock absorbing positioner including a pad body abutting against a surface of said bezel body that is distal from said display panel, and a positioning post protruding from one side of said pad body that is proximate to said bezel body, said positioning post being inserted consecutively and frictionally through said third through hole, said second through hole and said first through hole to fix together said bezel, said display panel and said resilient piece.

2. The display device as claimed in claim 1, wherein said resilient piece further includes a first positioning hole formed in said main plate and spaced apart from said first through hole, said protruding portion of said display panel being formed with a second positioning hole that is registered with said first positioning hole, said bezel further including a third positioning hole formed in said bezel body and registered with said second positioning hole, said display panel further including an auxiliary positioning element that includes a base portion having an outer diameter matching a hole diameter of said first positioning hole so as to be frictionally positioned therein, a spacer portion connected to said base portion and having an outer diameter larger than that of said base portion, and an extension portion extending from said spacer portion into said second and third positioning holes.

3. The display device as claimed in claim 2, wherein said extension portion of said auxiliary positioning element has an outer diameter smaller than a hole diameter of said second and third positioning holes, said auxiliary positioning element further including a positioning cap having an inner diameter matching that of said extension portion, and an outer diameter matching the hole diameter of said second and third positioning holes, said positioning cap being frictionally sleeved on said extension portion and being frictionally positioned in said second and third positioning holes.

4. The display device as claimed in claim 3, wherein said extension portion of said auxiliary positioning element has an outer surface formed with a plurality of projections.

5. The display device as claimed in claim 1, wherein said cover is provided with two spaced-apart limiting bodies corresponding in position to said resilient piece, each of said limiting bodies including a surrounding wall connected transversely to said inner surface of said cover, and a limiting wall connected to said surrounding wall and disposed oppositely of and parallel to said inner surface of said cover, said surrounding wall and said limiting wall of each of said limiting bodies cooperating with said inner surface of said cover to define a receiving space having an opening, said openings of said receiving spaces of said limiting bodies facing each other, said arm units of said resilient piece being bent arcuately in opposite directions after respectively extending from said two opposite lateral ends of said main plate toward said casing and being inserted respectively into said receiving spaces via said openings.

6. The display device as claimed in claim 5, wherein each of said arm units is configured as a bent plate, and is formed with an elongated slot.

7. The display device as claimed in claim 6, wherein said resilient piece further includes a clamping portion configured to clamp said protruding portion of said display panel, said clamping portion having a connecting plate extending transversely from an outer end of said main plate that is between said two opposite lateral ends thereof in a direction away from said cover, and a clamping plate extending from an end of said connecting plate that is distal from said main plate toward an inner end of said main plate that is opposite to said outer end.

8. The display device as claimed in claim 7, wherein said resilient piece and said frame and said protruding portion of said display panel are made of metal or are sputtered with metallic substances on surfaces thereof.

9. The display device as claimed in claim 6, wherein said cover further has a clamping portion formed on said inner surface thereof and disposed in a position corresponding to said resilient piece to clamp said protruding portion of said display panel, said clamping portion having a connecting plate extending from said inner surface of said cover and passing through an outer end of said main plate that is between said two opposite lateral ends thereof in a direction away from said cover, and a clamping plate extending from an end of said connecting plate that is distal from said main plate toward an inner end of said main plate that is opposite to said outer end.

10. The display device as claimed in claim 9, wherein said connecting plate has a wavy shape, and the wavy pattern of said connecting plate is such that a line that is tangent to a crest point of each wave and a line that connects the crest point and an adjacent trough point form therebetween an included angle that is smaller than 45 degrees.

11. The display device as claimed in claim 9, wherein said clamping portion and said frame and said protruding portion of said display panel are made of metal or are sputtered with metallic substances on surfaces thereof.

12. The display device as claimed in claim 1, wherein said resilient piece further includes a stud extending from a surface of said main plate that is distal from said cover, said stud being spaced apart from said first through hole, said protruding portion of said display panel being formed with a positioning hole to receive said stud.

13. The display device as claimed in claim 12, wherein each of said arm units of said resilient piece includes a pair of wavy arms connected between said main plate and said inner surface of said cover, and the wavy pattern of each of said wavy arms is such that a line that is tangent to a crest point of each wave and a line that connects the crest point and an adjacent trough point form therebetween an included angle that is smaller than 45 degrees.

14. The display device as claimed in claim 12, wherein said resilient piece further includes an auxiliary resilient member disposed between said first through hole and said stud, said auxiliary resilient member being formed on said main plate distal from said cover by stamping, and having a substantially L-shaped body configured to contact said protruding portion.

15. The display device as claimed in claim 13, wherein said resilient piece further includes an auxiliary resilient member disposed between said first through hole and said stud, said auxiliary resilient member being formed on said main plate distal from said cover by stamping, and having a substantially L-shaped body configured to contact said protruding portion.

16. The display device as claimed in claim 1, wherein said positioning post of said shock absorbing positioner has a peripheral surface formed with a first annular groove that is distal from said pad body, and a second annular groove that is proximate to said pad body, said resilient piece being retained in said first annular groove and said bezel and said protruding portion of said display panel being retained in said second annular groove when said positioning post extends consecutively through said third through hole, said second through hole and said first through hole.

17. The display device as claimed in claim 1, wherein said first through hole has a hole diameter smaller than that of said second and third through holes, said positioning post having a peripheral surface formed with an annular groove, said resilient piece being retained in said annular groove and said protruding portion and said bezel being retained between said annular groove and said pad body when said positioning post extends consecutively through said third through hole, said second through hole and said first through hole.

* * * * *